United States Patent [19]

Stumpf

[11] Patent Number: 4,851,959
[45] Date of Patent: Jul. 25, 1989

[54] SOLENOID ENGAGEMENT SENSING CIRCUIT

[75] Inventor: Paul B. Stumpf, Rochester, N.Y.

[73] Assignee: Eastman Kodak Company, Rochester, N.Y.

[21] Appl. No.: 223,583

[22] Filed: Jul. 25, 1988

[51] Int. Cl.⁴ .............................................. H01H 47/00
[52] U.S. Cl. ...................................... 361/159; 361/160
[58] Field of Search ............... 361/159, 160, 166, 204, 361/168.1, 169.1, 170, 179, 180

[56] References Cited

U.S. PATENT DOCUMENTS 4,387,306  6/1983  Sibley ................................... 361/203
4,538,203  8/1985  Flanner ................................ 361/159

Primary Examiner—A. D. Pellinen
Assistant Examiner—Leon K. Fuller
Attorney, Agent, or Firm—Edward Dugas

[57] ABSTRACT

In a disk memory library, picker arms, operated by a solenoid, are used to remove a selected disk from a library stack of disks and to place the disk in a reading/writing environment. The solenoid plunger's position is determined by noting its effect on a series resonant circuit that is formed with the coil inductance of the solenoid coil and a series capacitor. A function generator provides a triangular signal to the solenoid coil. An amplifier and peak detector are coupled to the coil to amplify and peak detect the voltage signal across the coil. A threshold detector, coupled to the output of the peak detector, is set to provide a digital output indicating when the solenoid's plunger is in or out. The function generator also provides a square wave that is synchronized to the triangle wave and is coupled to sample the output from the threshold detector. The change in the coil's inductance causes a phase shift in the triangle wave which further accentuates the voltage difference appearing across the coil. The output from the synchronous detector is used to determine when the plunger is in or out and, in turn, when the picker arms are extended or retracted.

9 Claims, 4 Drawing Sheets

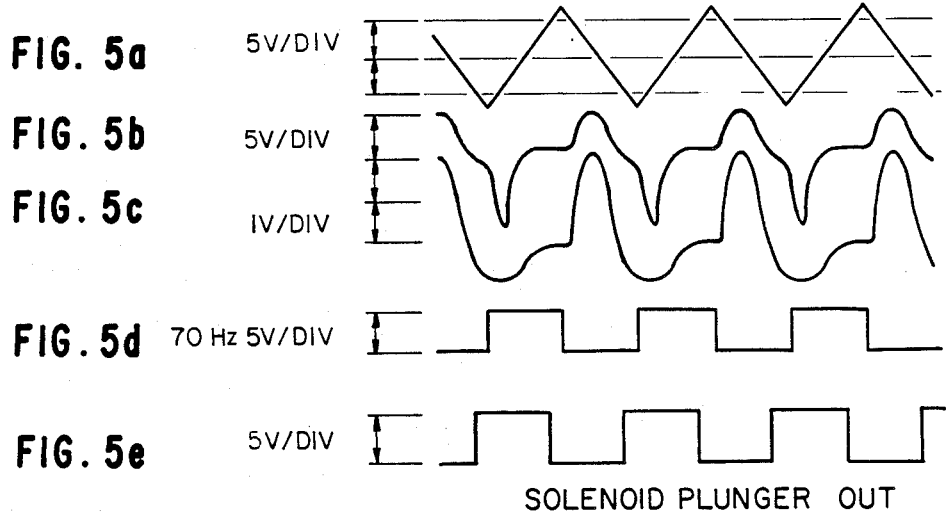
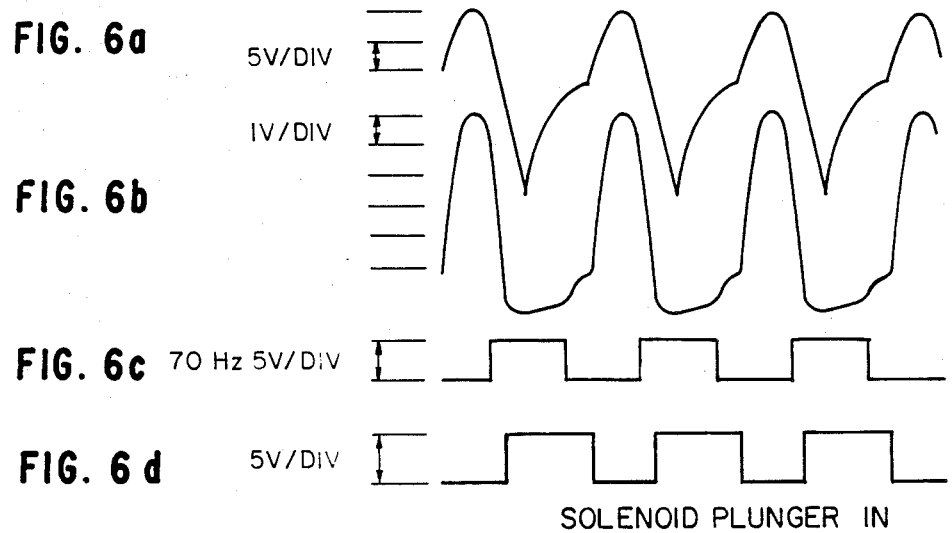

SOLENOID ENGAGEMENT SENSING CIRCUIT

TECHNICAL FIELD OF THE INVENTION

The present invention relates to a sensor for detecting the malfunction of a solenoid actuated member and, more particularly, to a sensor for detecting the position of picking fingers that are mechanically linked to a solenoid's plunger.

BACKGROUND OF THE INVENTION

Electromechanical systems, particularly the type that handle large libraries of stored data such as a disk library, can cause physical destruction of the data recorded on the recording media if a mechanical and/or electrical failure is not detected and all machine movement halted as a result of that detection. Various commercially available sensors are employed utilizing various techniques such as optical or inductive proximity for sensing mechanical position. These devices require additional wiring and bracketry which can adversely affect cost and reliability of the system. In addition, systems which utilize switch contacts tend to degrade over time and become unreliable making system protection illusionary. Solenoids provide an effective means for linking electronic signals to mechanical motion. In addition, there is a particular property that they also exhibit that can provide a means for detecting position. That is, the property of inductance of a coil, in this case, the coil of the solenoid which changes depending on the position of the iron core plunger with respect to the solenoid body. By sensing this inductance, it is possible to detect the occurrence of a mechanical event through the linkages associated with the plunger.

A patent of interest for its teaching is U.S. Pat. No. 4,387,306 entitled "Vital Contact Checking Circuit" by H. C. Sibley. The invention of that patent is concerned with railroad switch safety in that a determination of the position of a railroad switch whether open or closed is extremely important to the well-being of the trains running over the switch. To provide this detection, a transformer primary winding is used as a component of a serially tuned resonant circuit by the addition of a capacitor component and a signal source. The secondary winding passes on the transformed signal to an open and/or closed indicator circuit. A third winding is provided on the transformer with terminals that are connected to a contact switch, which switch in turn is controlled by the actual positioning of the railroad switching element.

In operation, when the third winding is shorted by the contacts of the switch, a detuning occurs in the series resonant frequency response of the primary winding and the capacitor to cause a diminished amplitude in the signal that is transformed to the secondary winding. This difference in signal amplitude is indicative of the positioning of the railroad switch contact.

SUMMARY OF THE INVENTION

In the preferred embodiment of the invention, a solenoid coil surrounds a movable plunger member and is activated in response to an applied power signal. A triangular wave generator provides a sensing signal to the solenoid coil. A capacitor is serially interposed between the output of the triangular wave generator and the solenoid coil and forms with the coil a series circuit. The frequency of the sensing signal is adjusted to cause a series resonance in the capacitor and the coil. A threshold detector is coupled to the coil to determine the voltage level appearing across the coil which voltage level is a function of the position of the plunger with respect to the solenoid coil. The threshold detector provides an output which indicates whether the plunger is engaged and/or disengaged from the coil body. Further sensitivity in the position detection can be afforded by utilizing a square wave signal to drive a synchronous detector having as another input the signal provided by the threshold detector. The output of the synchronous detector is thus a signal which is a function of the position of the plunger being engaged and/or disengaged. The increased sensitivity is accomplished through the fact that the triangular wave shifts phase as a function of the inductance of the solenoid coil, which changes depend upon the position of the plunger. The square wave signal, having bypassed the coil, is used as a reference to compare the phase shift which occurs in the sensing signal.

From the foregoing, it can be seen that it is a primary object of the present invention to provide an improved failure sensor for an electromechanical system.

It is a further object of the present invention to provide a fail-safe engagement sensor. It is a further object of the present invention to provide an improved sensing mechanism for sensing the extended and/or retracted position of picking fingers.

These and other objects of the present invention will become more apparent when taken in conjunction with the following description and drawings wherein like characters indicate like parts and which drawings form a part of the present description.

BRIEF DESCRIPTION OF THE DRAWINGS

FIGS. 5a–5e illustrate waveforms taken from points of interest in the circuit of FIG. 3 with the solenoid plunger out.

FIGS. 6a–6d illustrate waveforms taken at points of interest in the circuit of FIG. 3 with the solenoid plunger in.

DESCRIPTION OF THE PREFERRED EMBODIMENT

Figure 1:
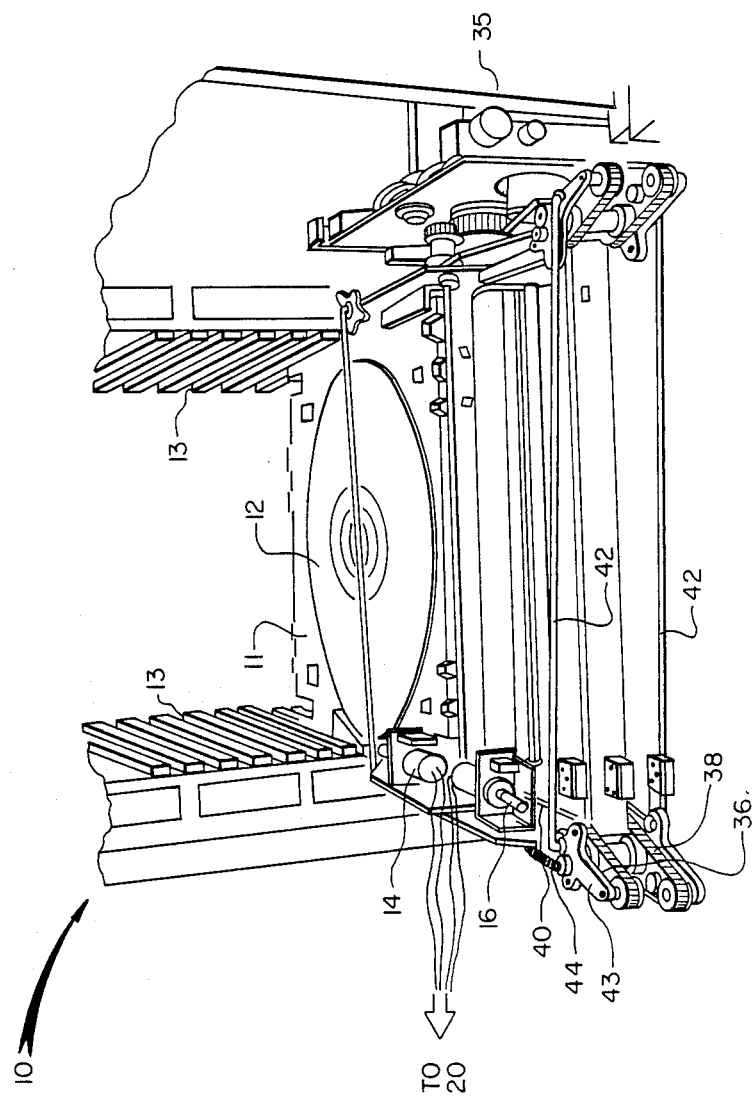
FIG. 1 is a cutaway perspective view of an optical disk picking mechanism utilizing the safety solenoid circuit of the present invention.

FIG. 1 illustrates the physical arrangement of a library 10 for storing a plurality of optical disks 12 each mounted within a carrier 11 in guide tracks 13. Each of the disks 12 may be of the 14 inch optical type having 3.5 Giga bites of data recorded on each side. A picker assembly 35 operates to vertically position two pairs of picker arm assemblies 36 into the correct alignment with the storage track 13 containing the desired optical disk 12. Once at the desired position, the picker arm assemblies 36 are extended into the area occupied by the carrier 11 and picker belts 38 are driven into engagement with the surface of the carrier 11 to draw the carrier out from between the racks and into a transport position on the picker assembly 35. Solenoids 14 and 16 when energized cause the picker arm assemblies 36 to engage the carrier 11. This operation is performed by the solenoid plungers 17 being mechanically linked through rods 40 and 42 to the picker arm levers 43. When the solenoid is disengaged, springs 44 retract the picker arm assemblies 36. As can be appreciated, if the picker arm assemblies 36 do not retract from the area between the guide rails and the picker assembly is elevated to place the optical disk 12 into a reading position, the picker arm assemblies will crash against the adjacent stored disks thereby causing physical damage to the optical disks stored within their respective carriers. The destruction caused by this crash may not be limited to one disk if in fact the picker arm elevator moves past the adjacent disk and extends into the area occupied by other stored disks.

Figure 2:
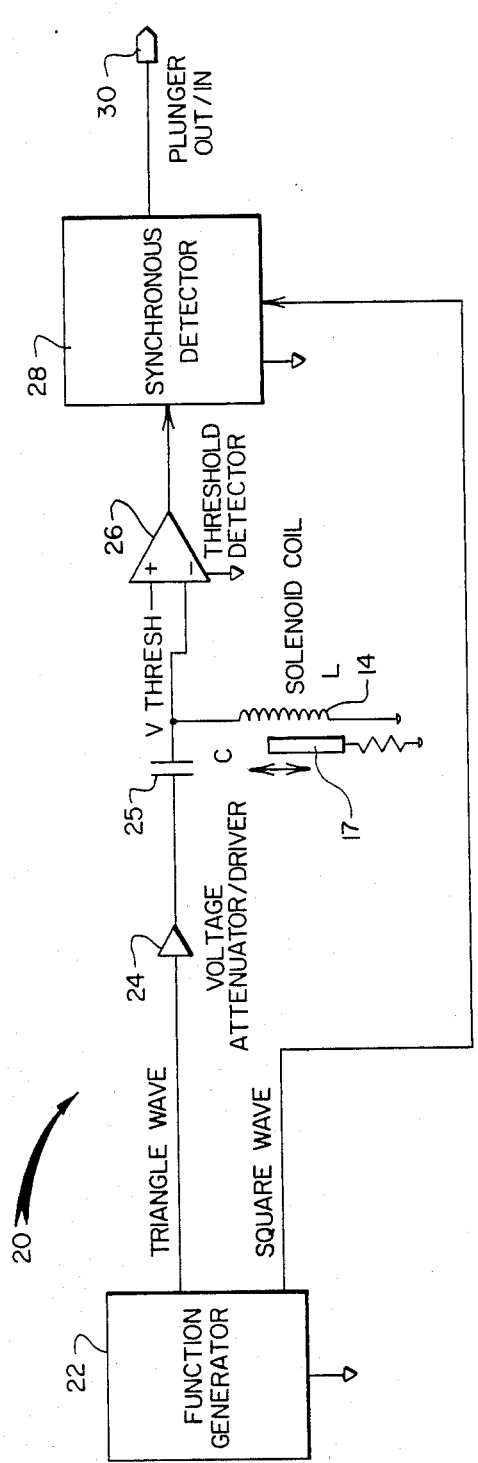
FIG. 2 is a block circuit diagram of the engagement sensing circuit of the present invention.

Referring now to FIG. 2, the solenoid coil 14 is connected to the triangular wave output (sensing signal) of a function generator 22 by means of a voltage attenuator/driver 24 and a series connected capacitor 25. The frequency of the triangular wave signal, from the function generator 22, is adjusted to be substantially the resonant frequency of the series connected circuit of the solenoid coil and the capacitor 25. The function generator 22 also provides a square wave signal which square wave signal is directed to an input to a synchronous detector 28. The voltage appearing across the solenoid coil 14 is directed to the negative input of a threshold detector circuit 26. A preselected threshold voltage is applied to the positive input to the threshold detector 26. The preselected threshold voltage is established as being the voltage corresponding to the voltage appearing across the solenoid when the solenoid plunger 17 is approximately one-half engaged within the solenoid coil body 14. The output signal from the threshold detector is therefore a binary signal having one value when the plunger is not fully engaged and a second value when the plunger is fully engaged.

The phasing of the threshold detector output signal as compared against the square wave signal will vary as a function of the inductance L of the solenoid coil. The inductance L changes as a function of the position of the plunger 17. The voltage appearing across the solenoid coil likewise changes as the plunger through its motion within the coil body changes the resonance of the series resonance circuit. The synchronous detector 28 provides the plunger out/in signal on terminal 30 in response to the thresholded signal and the phase difference between the thresholded signal and the square wave signal.

Figure 3:
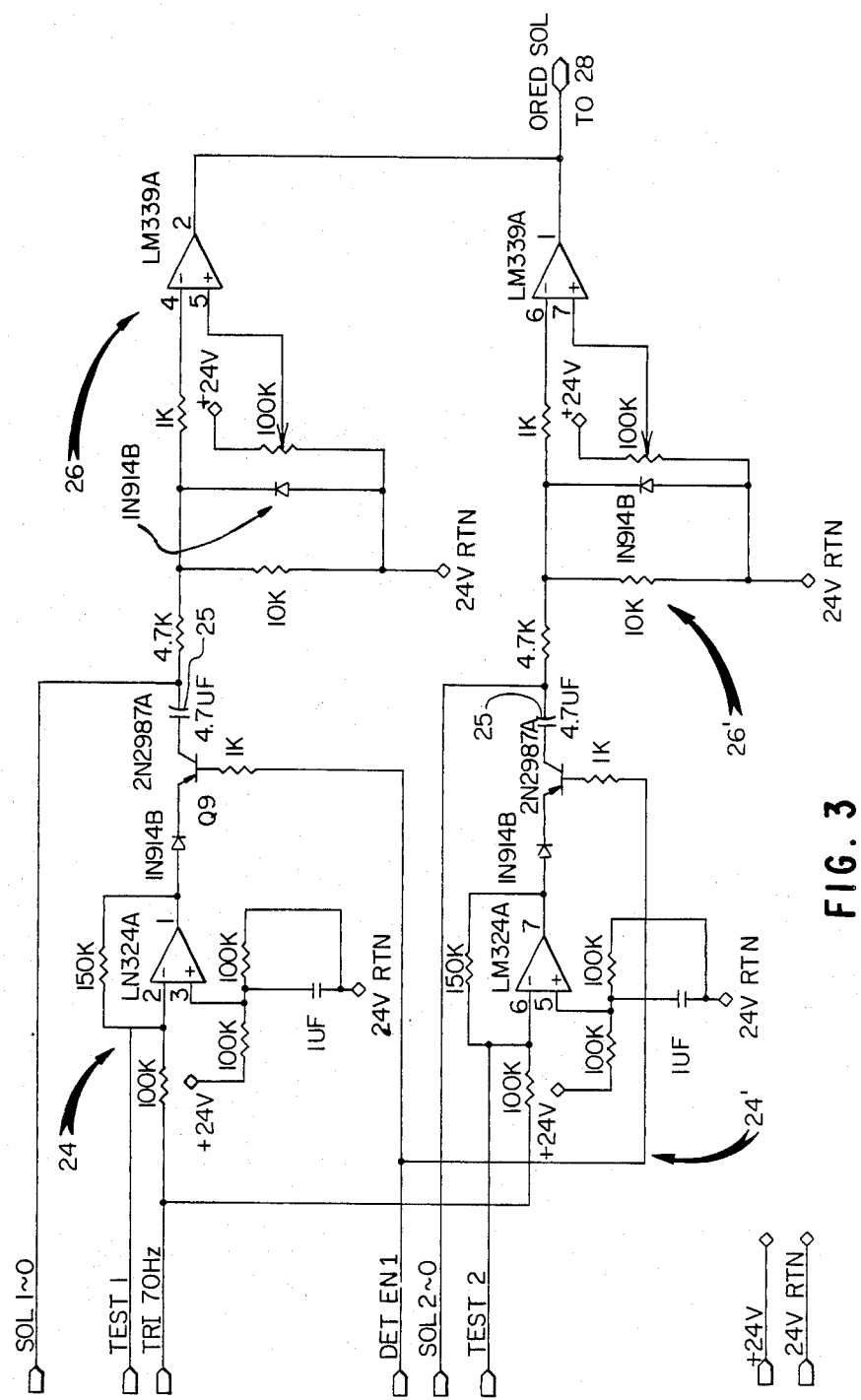
FIG. 3 is a detailed circuit diagram of the embodiment shown in FIG. 2.

Referring now to FIG. 3, the voltage attenuator/driver 24 for driving solenoid 14 is shown comprised of one-quarter of an operational amplifier circuit chip of the type commercially available under Part No. LM324A. A voltage divider circuit formed from two 100K resistors connected between a plus +24 volt supply and 24 volt return, RTN, is connected to the positive input of the comparator. Applied to the negative input is a triangular wave TRI which is 70 Hz in frequency. Also applied to the negative input is a TEST 1 terminal. The output of the operational amplifier is fed back to the input labeled 2 by means of a 150K resistor. The output of the comparator is coupled to a 2N2987A transistor Q9 by means of a diode IN914B. The collector of transistor Q9 is connected to a capacitor 25. The capacitor 25 is connected to the solenoid 14 by means of the terminal labeled SOL 1. The capacitor/solenoid junction is connected to the negative input of a comparator 26 formed from one-half of an LM339A chip. A 100K potentiometer is connected between the +24 volt supply and the 24 voltage return with the wiper arm of the potentiometer being connected to the positive input of the threshold detector 26. The potentiometer is adjusted to provide the threshold voltage level which indicates whether the solenoid plunger is in or out with respect to the coil winding.

The voltage divider formed from the 4.7K resistor junctioned to the 10K resistor protects the input to the comparator 26 from excessive positive voltages appearing in conjunction with the solenoid coil 14. The diode IN914B protects against negative voltage transients. The base of transistor Q9 is connected to a terminal labeled DET EN1.

In operation, when the solenoid is to be driven by the power signal, the transistor Q9 is turned off so as to electrically remove the capacitor from the circuit so that a charge cannot be stored on capacitor 25. Because the voltage attenuator/driver 24 is disengaged during solenoid actuation with the power signal, there could possibly exist the circumstance in which the sensor circuit had failed in a clear state. Such being the case, a TEST 1 signal feature was added.

The TEST 1 signal input can be used to inject a signal which is of sufficient amplitude and at a frequency which would simulate a plunger in condition without actually engaging the solenoid. The operating electronics and any associated software, therefore, has a remote access to the sensing circuit for test purposes. Occasional testing during appropriate time cycles (i.e., when the elevator is not moving) provides a higher level of integrity to the sensing circuit.

The lower half of the circuitry shown in FIG. 2 is directed to the operating electronics for the second solenoid 16. The attenuator/driver 24' is identical in construction to that of attenuator/driver 24 and, in a like manner, the threshold detector 26' is identical in fabrication to the threshold detector 26. The output signals from the threshold detectors 26 and 26' are logically OR'ed together to provide the output to the synchronous detector 28.

Figure 4:
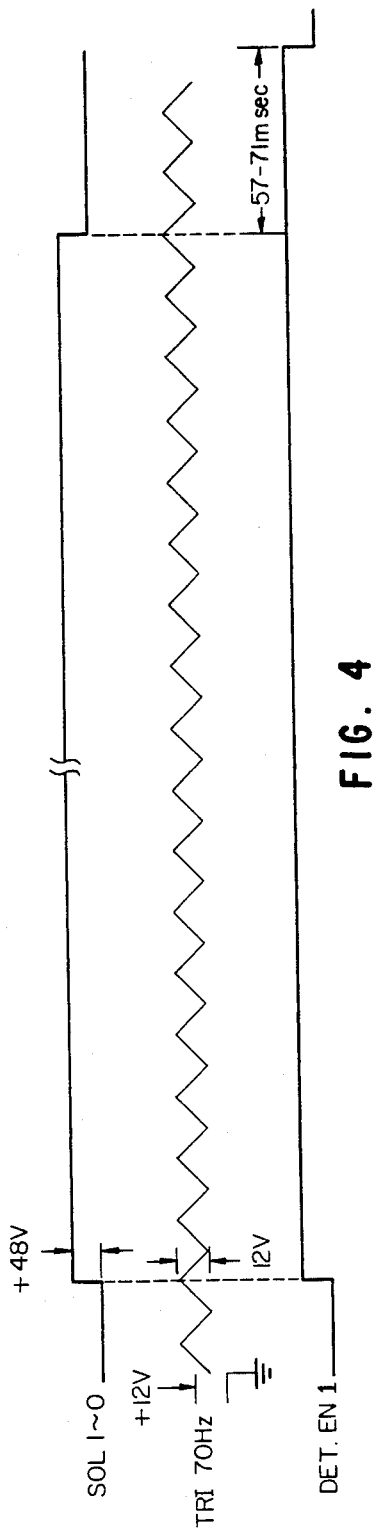
FIG. 4 are three waveforms that are useful in understanding the operation of the circuitry of FIGS. 2 and 3.

In FIG. 4, the three illustrated waveforms are the solenoid drive signal SOL 1 having a magnitude of 48 volts when active. The signal TRI is biased to its central position with +12 volts DC and has a peak-to-peak amplitude value of 12 volts. The DET EN1 signal, which causes transistor Q9 to operate in the open collector mode, disables the triangular waveform signal from being injected into the coil and prevents the capacitor 25 from charging while the solenoid is being engaged with the power signal. The DET EN 1 signal is active low and becomes active approximately 60 milliseconds after the power signal to the solenoid becomes inactive.

Referring now to FIG. 5a, the 12 volt peak-to-peak amplitude triangular wave signal applied to the TR1 inputs 2, 6 to the voltage attenuator/driver circuits 24 and 24', respectively, is compared with other signals appearing throughout the circuit. In FIG. 5b, the waveform shown therein is for the condition with the solenoid plunger being out. The waveform has a vertical amplitude equivalent to 5 volts for the division shown and is taken at the juncture of the capacitor 25 and the 4.7K resistor. In FIG. 5c, the waveform has a vertical sizing of one volt per division and is taken from the juncture of the 4.7K resistor and the 1K resistor connected to the minus input of the threshold detector 26. The square wave signal from the function generator 22 is shown in FIG. 5d with a 5 volt height. FIG. 5e shows the voltage present at the output of the comparator 26.

In FIGS. 6a-6d, we have waveforms occurring at the identical spots corresponding to those with reference to FIGS. 5b-5e. The waveforms of FIGS. 6a-6d correspond to the solenoid plunger being in the coil winding. The amplitudes of the voltages of FIGS. 6a and 6b are substantially higher than those of FIGS. 5b and 5c. Also, the phase difference between the waveforms of FIGS. 6c and 6d is shifted from that of FIGS. 5d and 5e. The synchronous detector 28 detects this phase difference, by sampling the logic level at the output of the threshold comparator at the rising edge of the 70 Hz clock (see FIGS. 5c and 5d). As can be seen from FIG. 5e, the logic value at the rising edges of the square wave of FIG. 5d are high and indicating a plunger out condition. The inverse occurs with the FIG. 6d square wave with respect to the rising edges of the square wave of FIG. 6c indicating a plunger in condition. The sampled comparator output at terminal 30 may then be used by associated operating electronics as an alarm sensor activator for indicating an unretracted picker arm assembly.

While there has been shown what is considered to be the preferred embodiment of the present invention, it will be manifest that many changes and modifications may be made therein without departing from the essential spirit of the invention. It is intended, therefore, in the annexed claims, to cover all such changes and modifications as may fall within the true scope of the invention.

I claim:

1. A solenoid engagement sensing circuit comprising:
   a solenoid having a coil and a plunger, said plunger movable within said coil in response to an applied power signal;
   a triangle wave generator for generating a triangular sensing signal;
   a capacitor serially coupling said solenoid coil in circuit with said triangle wave generator, and said sensing signal having a frequency that causes a series resonance in said capacitor and said coil;
   detector means connected to said coil to determine the voltage level across said coil as a function of the position of said plunger within said coil; and
   indicating means responsive to the determined voltage level from said detector means for indicating the position of said plunger within said coil.

2. The solenoid engagement sensing circuit according to claim 1 and further comprising:
   signal generator means for generating a square wave signal that is synchronous with said triangular sensing signal, said sensing signal applied to said detector means to reference the change in phase in the voltage level across said coil.

3. The solenoid engagement sensing circuit according to claim 2 and further comprising:
   means for electrically removing said capacitor from circuit with said solenoid coil when said power signal is applied to said coil.

4. A solenoid engagement sensing circuit comprising:
   a series circuit including a capacitor, a coil and an iron plunger in magnetic proximity to said coil;
   means for driving current through said coil to move said iron plunger;
   means for providing a sensing signal having a frequency corresponding to the resonant frequency of said series circuit;
   detector means for detecting the voltage across said coil;
   means for providing a reference signal corresponding in frequency and phase to said provided sensing signal; and
   synchronous detector means for receiving the detected voltage from said detector means and said reference signal for providing an output signal as a function of the difference in phase between said detected voltage and said reference signal.

5. A solenoid engagement sensing circuit according to claim 4 and further comprising:
   means for electrically removing said capacitor from said series resonant circuit when driving current is applied to said coil.

6. A solenoid activated picker assembly safety circuit comprising:
   a picker arm assembly;
   a solenoid having a coil body and a plunger, movable within said body;
   mechanical linkage coupling said plunger to said picker arm assembly;
   means for applying a power signal to said coil body to activate said picker arm assembly;
   means for applying a sensing signal to said coil;
   means for detecting the inductance of said coil as a function of the position of said picker arm assembly; and
   means for comparing the detected inductance of said coil to an unsafe position of said picker arm assembly to generate a disabling signal.

7. The solenoid activated picker assembly safety circuit according to claim 6 and further comprising:
   a capacitor connected electrically in series with said coil body; and
   means for providing a reference signal to said means for detecting corresponding in frequency and phase to said sensing signal for enhancing the detection of the inductance of said coil.

8. The solenoid activated picker assembly safety circuit according to claim 7 and further comprising:
   means for electrically removing said capacitor from series connection with said coil body when the power signal is applied to said coil body.

9. The solenoid activated picker assembly safety circuit according to claim 8 wherein the sensing signal is a triangular wave and wherein said reference signal is a square wave, synchronous with the triangular wave.

* * * * *